UNITED STATES PATENT OFFICE.

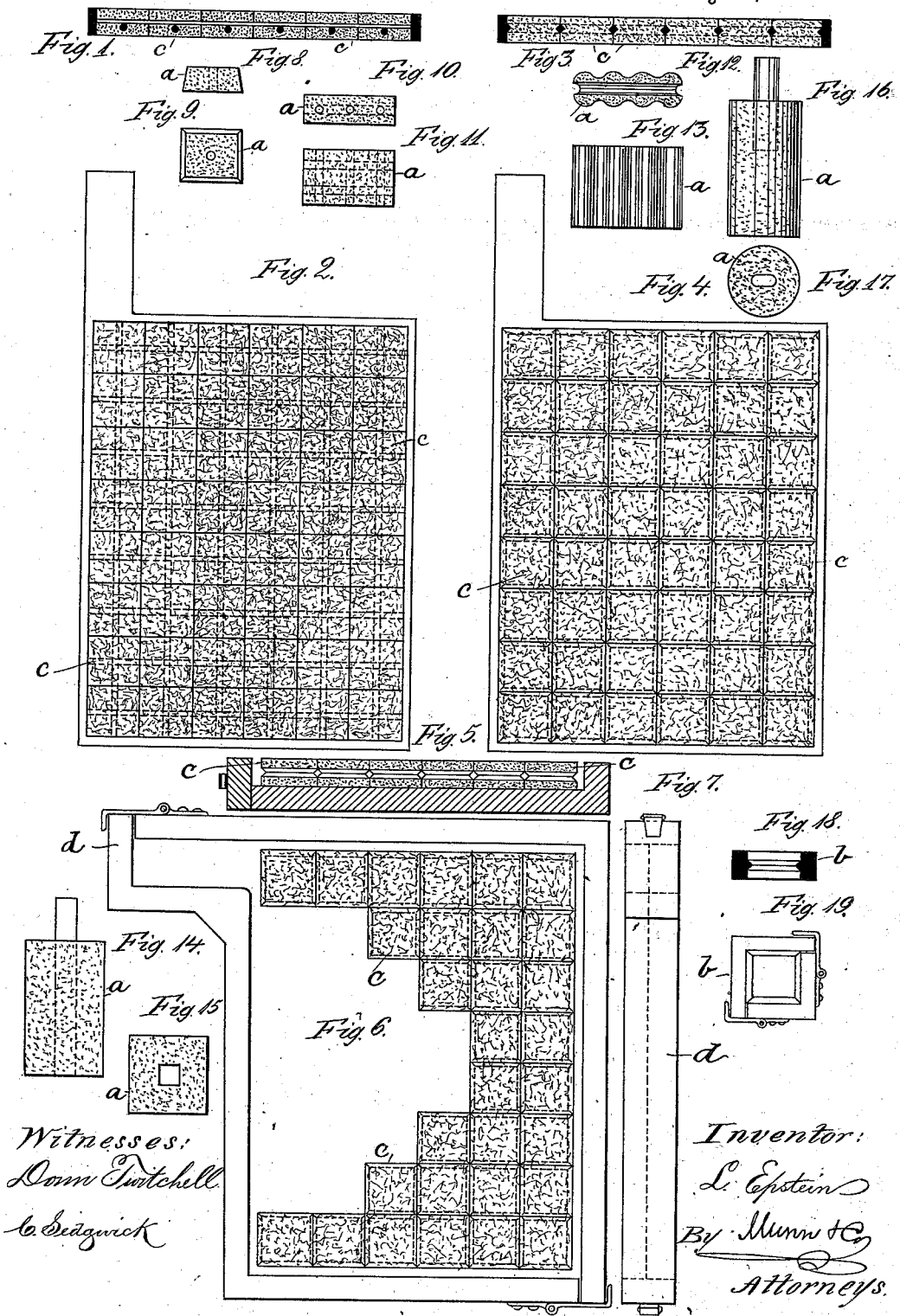

LUDWIG EPSTEIN, OF MARTINIKENFELDE, NEAR BERLIN, GERMANY.

SECONDARY BATTERY.

SPECIFICATION forming part of Letters Patent No. 382,420, dated May 8, 1888.

Application filed February 18, 1887. Serial No. 228,060. (No model.) Patented in Germany August 17, 1883, No. 27,675, and May 1, 1884, No. 29,924; in France June 13, 1884, No. 162,730; in Belgium June 13, 1884, No. 65,464; in England June 19, 1884, No. 9,195; in Italy June 30, 1884, XXXIV, 77, and in Austria-Hungary November 11, 1884, XXXIV, 2,228, and XVIII, 2,194.

*To all whom it may concern:*

Be it known that I, LUDWIG EPSTEIN, a subject of the Emperor of Austria-Hungary, residing at Martinikenfelde, near Berlin, in the Kingdom of Prussia, German Empire, have invented new and useful Improvements in Secondary Batteries, (which have been patented in France, No. 162,730, dated June 13, 1884; in Italy, No. 77, volume 34, dated June 30, 1884; in Belgium, No. 65,464, dated June 13, 1884; in Austria-Hungary, tome 34, folio 2,228, and tome 18, folio 2,194, dated November 11, 1884; in Germany, No. 27,675, dated August 17, 1883, and No. 29,924, dated May 1, 1884, and in England, No. 9,195, dated June 19, 1884,) of which the following is a specification.

This invention relates to the production of a finely-divided lead compound and its application for forming electrodes of secondary batteries.

A compound or preparation of lead suitable for use in the cells of secondary batteries is obtained by adding an oxide of lead or salt of lead, preferably sulphate of lead, to molten metallic lead and stirring the mixture continually and thoroughly until the liquid mass has been transformed into a finely-divided powder.

On a small scale the material can be produced by melting lead in a suitable vessel or crucible, and then removing it from the fire and adding to it a lead oxide or lead salt which is in the form of powder. The proportion which I find most suitable is from twenty to thirty grams of a lead oxide or lead salt, preferably lead sulphate, to one thousand grams of lead. The mixture is well stirred with iron rods or small shovels while it is cooling, and the preparation in question is obtained. Any coarser parts may be removed by sifting.

On a large scale the metal is melted in suitable vessels, and then poured or let off into a mixing-drum, into which the lead oxide or lead salt is also put, containing one or more agitators provided with scoops, blades, or teeth, the said agitators being set in motion by steam or other power.

The mixing-vessel should be kept at such a temperature that solidification does not commence until there has been time for the thorough admixture and prolonged agitation of the mass. The product obtained is a very fine powder. The mixing and stirring of the mass may also be produced by means of a current of steam or air introduced under sufficiently high pressure into the vessel containing the above-named materials.

Another method consists in allowing the molten lead to flow in a thin stream out of a vessel containing an outlet and forcing the lead oxide or lead salt, which is in the form of powder, against the outflowing lead by means of a blower or steam-pressure; or the vessel containing the molten lead is placed in front of another receptacle, also provided with an opening and containing the lead oxide or lead salt, and the lead is forced against this latter material as it flows out.

The product thus obtained may be sieved afterward; or a sieve may at once be so placed that the broken-up particles are forced against it, the finer parts passing through, while any coarser parts are retained. To produce electrodes from this material, I employ several methods, of which the most important are the following, viz: The powder thus obtained is reduced to a stiff paste by adding water thereto and well stirring and mixing the mass. Of this paste bodies of any desired shape or size may now be formed by means of molds and of a lever-screw or hydraulic press, or by passing it under or through rollers, or by any other appliance suitable to compress the pasty material into shape. By this pressure the stiff paste is so far consolidated as to hold firmly together, or even to admit of connections being soldered to it, but; nevertheless, it remains porous, and the electrodes produced therefrom are freely permeated by the electrolyte. Sometimes I introduce into the mold a frame of lead or some other suitable conducting material to strengthen the electrodes thus formed.

According to another method cakes of any desired size, generally about one hundred and twenty millimeters by eighty millimeters, and varying in thickness from one to six millimeters, are pressed first, or flat cakes are rolled out, and these are dried by the air or moderate heat. These cakes are then cut into slabs by means of a band or circular saw, or by stamping or any other suitable means.

The slabs or cakes may be quite solid or notched or grooved, the said notches or grooves serving partly to receive the molten lead or other suitable conducting material and partly to permit the free circulation of the electrolyte and to obtain a greater surface.

Referring to the accompanying drawings, Figures 8 to 17 show bodies or blocks $a$ made according to my method. Figs. 18 and 19 represent a mold, $b$, for forming square blocks. These slabs $c$, cut or otherwise formed, are grouped in a mold, $d$, side by side or one over the other, or both kinds of grouping are combined with interstices left between each slab, and are connected together by running in molten lead or some other suitable conducting material, as shown in Figs. 1 to 7. By the flow of lead into the open channels, and owing to the contraction which takes place when the lead is cooling, a cohesive frame or net-work is formed round these slabs adapted to give the plates a great degree of stability.

The lead compound prepared as heretofore described may also be used, either in an oxidized or a reduced state, in a cell of a primary or secondary battery by packing it upon or round an electrode of any suitable material. The oxidation or reduction of the lead compound may take place before or after packing.

A desired number of electrodes produced by any of these methods is united by casting or soldering to positive or negative groups, respectively, put into vessels containing dilute sulphuric acid and formed in the usual way.

Previous to the electrical formation I find it advantageous to bathe the electrodes in dilute nitric acid—about one part of nitric acid to from eighty to one hundred parts of water—leaving them in the bath for about ten hours. The cohesiveness of the material forming the slabs or cakes is thereby improved. I also prefer forming all electrodes negative first by connecting them all with the negative pole of the charging-dynamo and by putting plates of sheet-lead in, which are connected with the positive pole of the dynamo. After thorough reduction these plates of sheet-lead are removed and the proper positives formed.

A suitable frame-work of paraffined wood or india-rubber bands or strips round the electrodes keep them in their proper place.

Having now particularly described and ascertained the nature of my said invention and in what manner the same is to be performed, I declare that what I claim is—

1. The method herein described of preparing powdered lead for electrodes, consisting in adding sulphate of lead to molten metallic lead and stirring the liquid mass until it has been transformed into a finely-divided powder, as set forth.

2. The method herein described of making electrodes, consisting in reducing a powder of metallic lead and salt of lead to a paste and then compressing the mass and forming it into the desired shape.

3. The herein-described method of forming electrodes, consisting in reducing a finely-divided lead-powder into a paste, forming the mass into slabs, and finally uniting the slabs together by means of molten metal, as set forth.

4. The method herein described of forming electrodes, consisting in reducing a finely-divided lead-powder into a paste, compressing the mass in a cake, cutting the cakes into notched or grooved slabs, and uniting the slabs together by means of molten metal, as set forth.

5. An electrode consisting of a series of bodies of metallic lead and sulphate of lead and a metallic uniting medium between the said bodies, substantially as described.

In testimony whereof I have signed my name to this specification in the presence of two subscribing witnesses.

LUDWIG EPSTEIN.

Witnesses:
 LEO SHIMER,
 B. ROI.